(12) United States Patent
Hoogerhyde et al.

(10) Patent No.: US 9,290,916 B2
(45) Date of Patent: Mar. 22, 2016

(54) REMOVABLE FIRE HYDRANT NOZZLE WITH IMPROVED LOCKING STRUCTURE

(71) Applicant: EJ USA, Inc., East Jordan, MI (US)

(72) Inventors: Eric Nelson Hoogerhyde, Mancelona, MI (US); Patrick Francis Brennan, East Jordan, MI (US); Bryan James Griffin, Petoskey, MI (US); Kyle Thomas Peters, East Jordan, MI (US)

(73) Assignee: EJ USA, Inc., East Jordan, MI (US)

( * ) Notice: Subject to any disclaimer, the term of this patent is extended or adjusted under 35 U.S.C. 154(b) by 137 days.

(21) Appl. No.: 14/276,026

(22) Filed: May 13, 2014

(65) Prior Publication Data

US 2015/0330062 A1  Nov. 19, 2015

(51) Int. Cl.
| | |
|---|---|
| *E03B 9/02* | (2006.01) |
| *E03B 9/06* | (2006.01) |
| *F16L 21/035* | (2006.01) |
| *F16L 21/08* | (2006.01) |
| *F16L 37/244* | (2006.01) |

(52) U.S. Cl.
CPC ... *E03B 9/02* (2013.01); *E03B 9/06* (2013.01); *F16L 21/035* (2013.01); *F16L 21/08* (2013.01); *F16L 37/244* (2013.01); *F16L 37/2445* (2013.01); *Y10T 137/5485* (2015.04)

(58) Field of Classification Search
CPC ............ E03B 9/01; E03B 9/06; F16L 21/035; F16L 21/08; F16L 37/2445; A62C 35/20; A62C 31/02
See application file for complete search history.

(56) References Cited

U.S. PATENT DOCUMENTS

| | | | | |
|---|---|---|---|---|
| 2,056,927 A | * | 10/1936 | Leslie .................... | F16L 37/12 285/326 |
| 3,295,553 A | * | 1/1967 | Garrett ................... | B64D 39/06 137/614.06 |
| 4,172,606 A | * | 10/1979 | Howe ..................... | F16L 19/00 285/148.19 |
| 4,402,531 A | * | 9/1983 | Kennedy, Jr. ........ | F16L 55/1155 285/14 |
| 6,447,027 B1 | * | 9/2002 | Lilley .................... | F16L 37/113 285/148.19 |
| 2008/0245420 A1 | * | 10/2008 | Davidson .............. | A62C 35/20 137/296 |
| 2010/0307609 A1 | * | 12/2010 | Burt ....................... | E03B 9/02 137/294 |
| 2010/0313965 A1 | * | 12/2010 | Sigelakis .............. | E03B 9/02 137/15.02 |
| 2011/0308824 A1 | * | 12/2011 | Sigelakis .............. | A62C 35/20 169/46 |

OTHER PUBLICATIONS

Attached photos of fire hydrant nozzle offered for sale in the United States at least as early as May 12, 2014, and as described in the Information Disclosure Document.

* cited by examiner

*Primary Examiner* — Craig Schneider
*Assistant Examiner* — Kevin Barss
(74) *Attorney, Agent, or Firm* — Warner Norcross and Judd LLP

(57) ABSTRACT

A removable hydrant nozzle with a locking arrangement for securing the nozzle in a nozzle opening. The locking arrangement includes an axially movable slide configured to selectively engage a portion of the hydrant adjacent the nozzle opening, such as a lug mouth in a quarter-turn fitting. The slide is mounted to a slide housing and is spring loaded. In use, the slide automatically retracts as the nozzle is inserted into the nozzle opening and automatically extends into locking engagement with the mouth when the nozzle becomes fully seated. Once engaged, the slide prevents removal of the nozzle until manually disengaged. The slide may be movably mounted on a pair of shoulder bolts. The slide may include a paddle that extends outwardly where it is accessible to the operator. The nozzle may include a handle and a seal fitted onto the inner axial end of the nozzle.

24 Claims, 14 Drawing Sheets

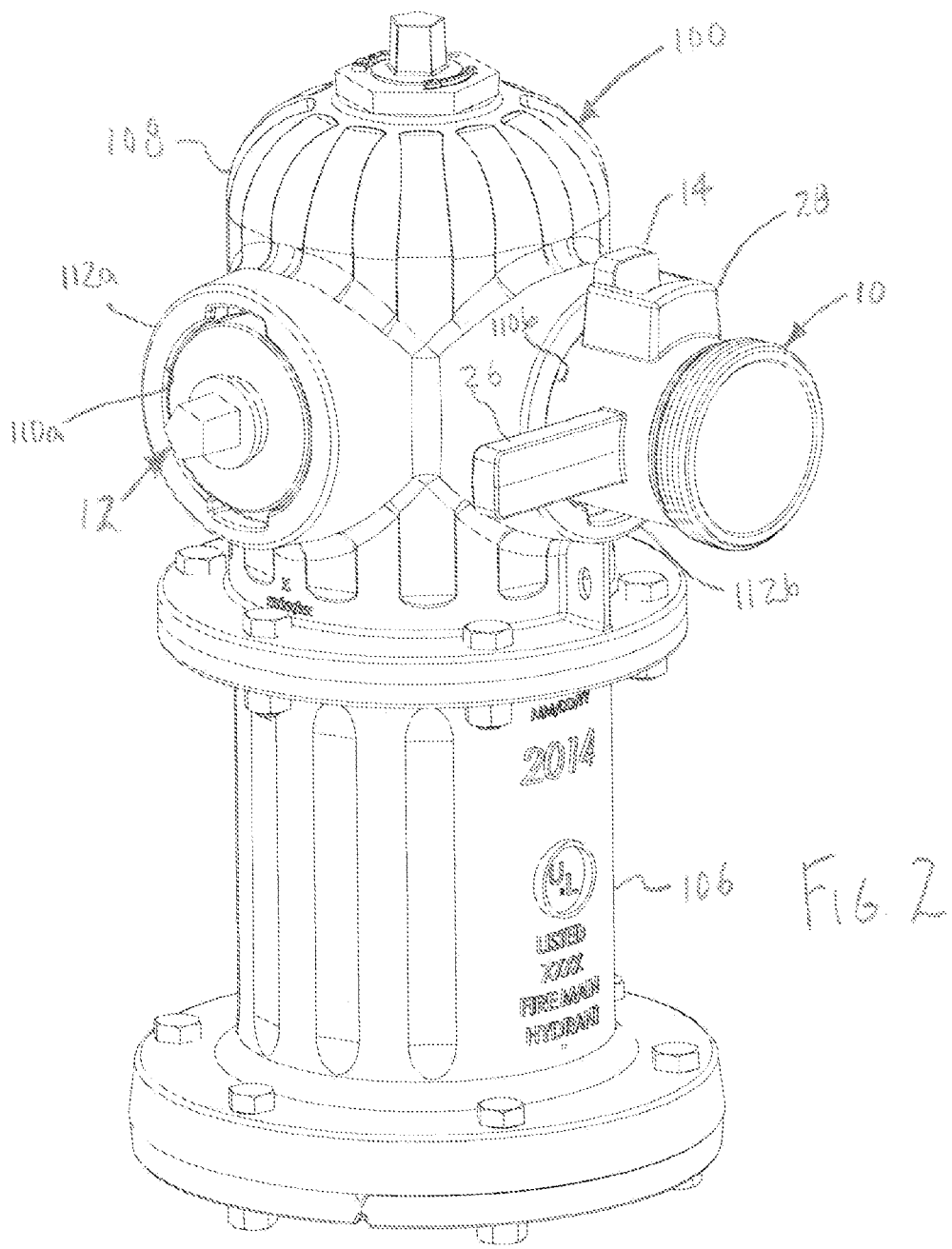

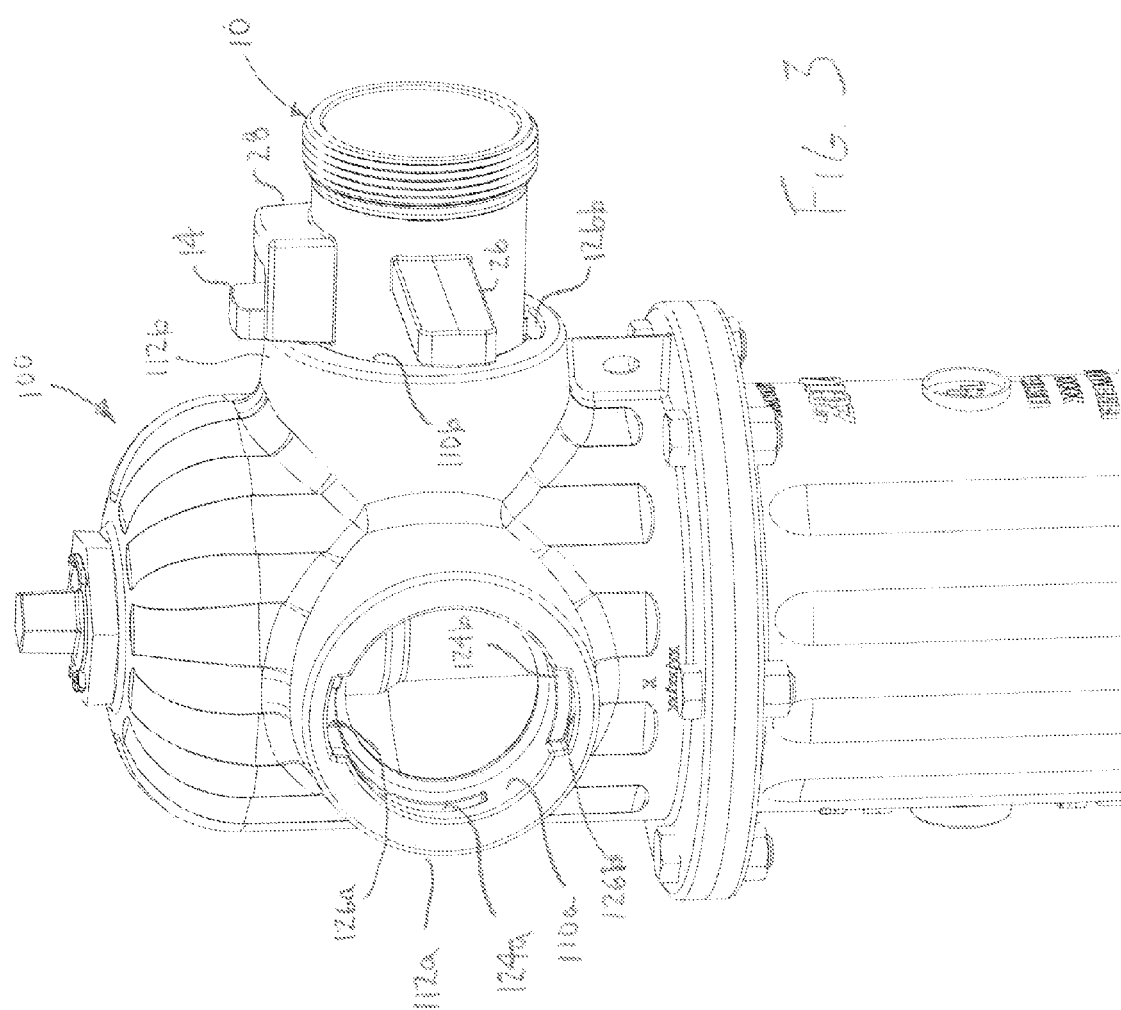

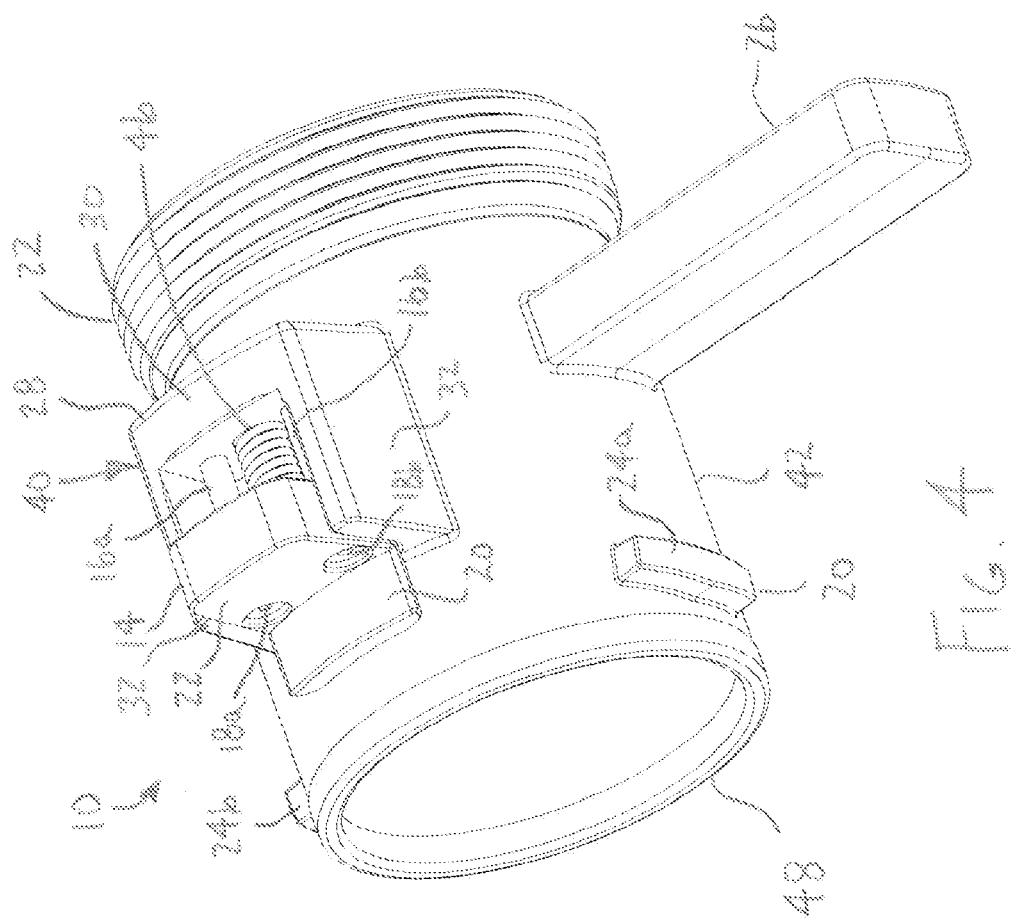

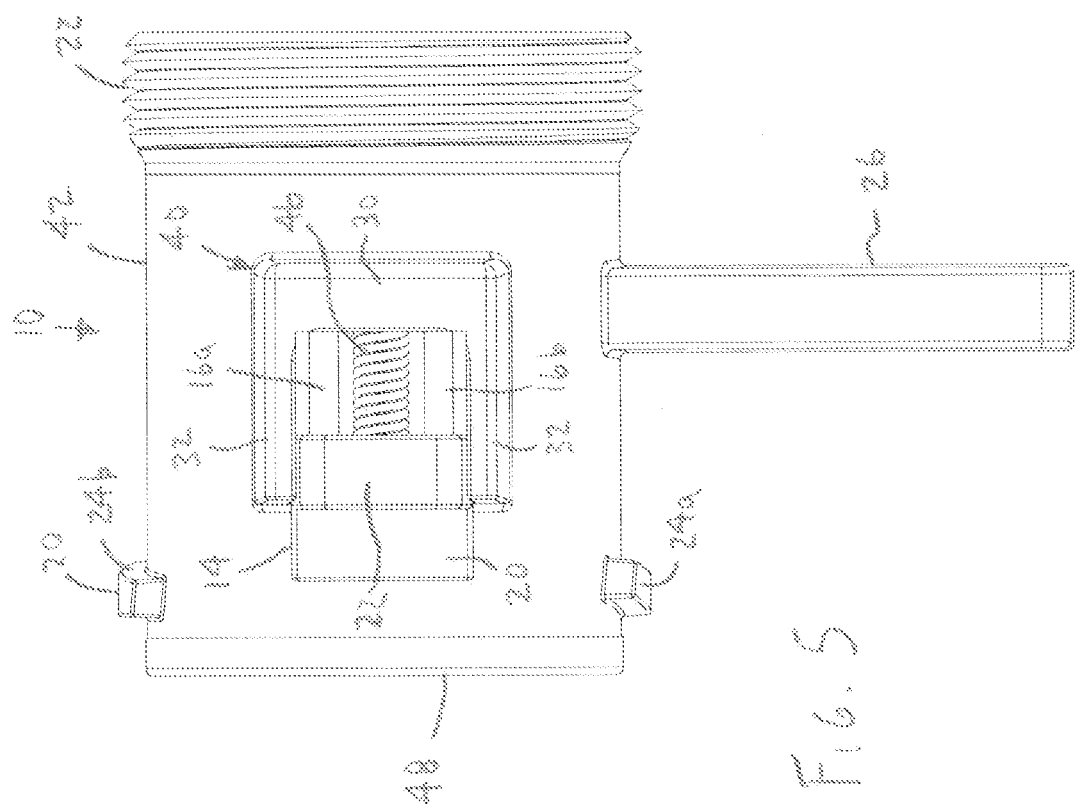

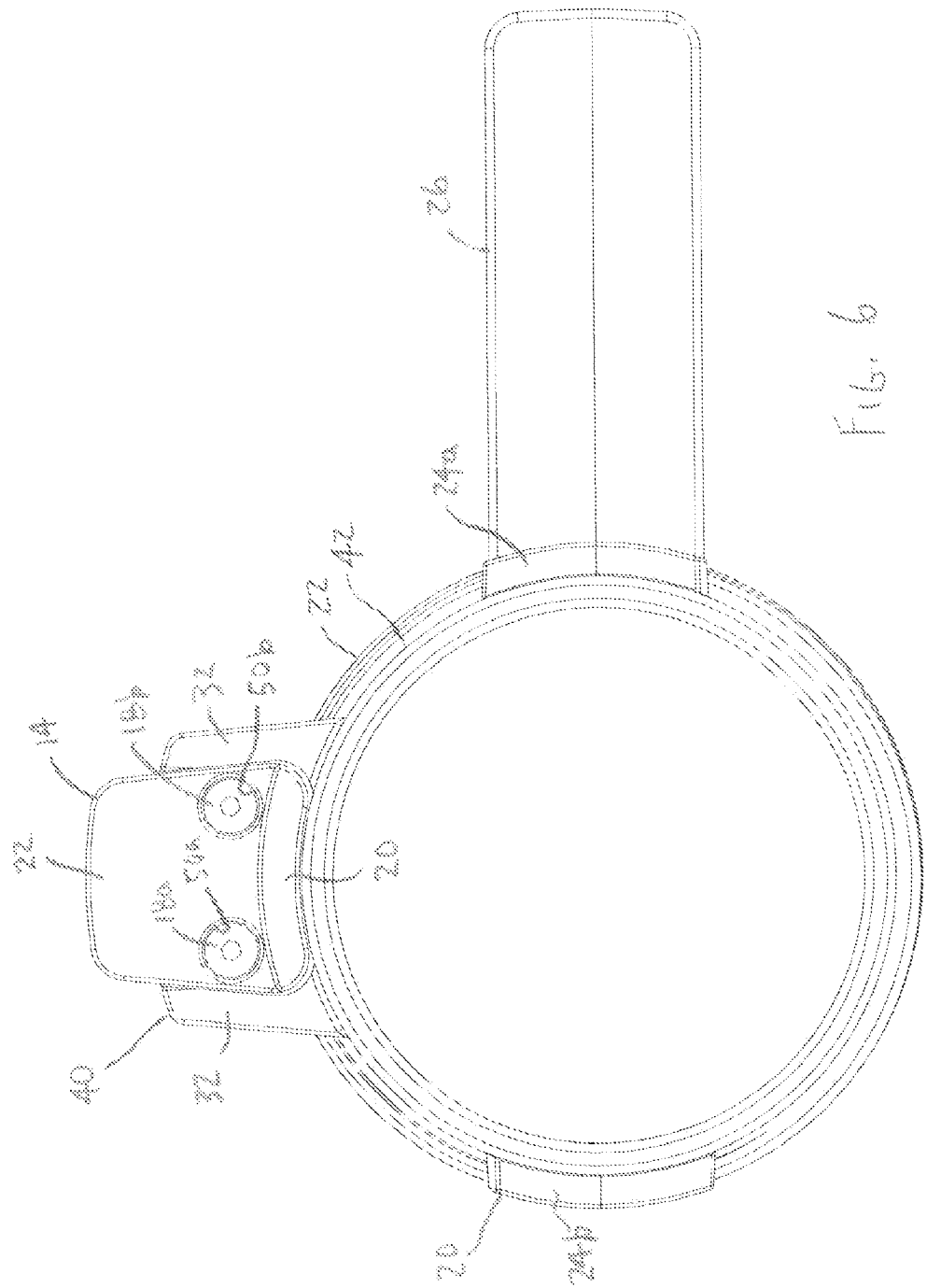

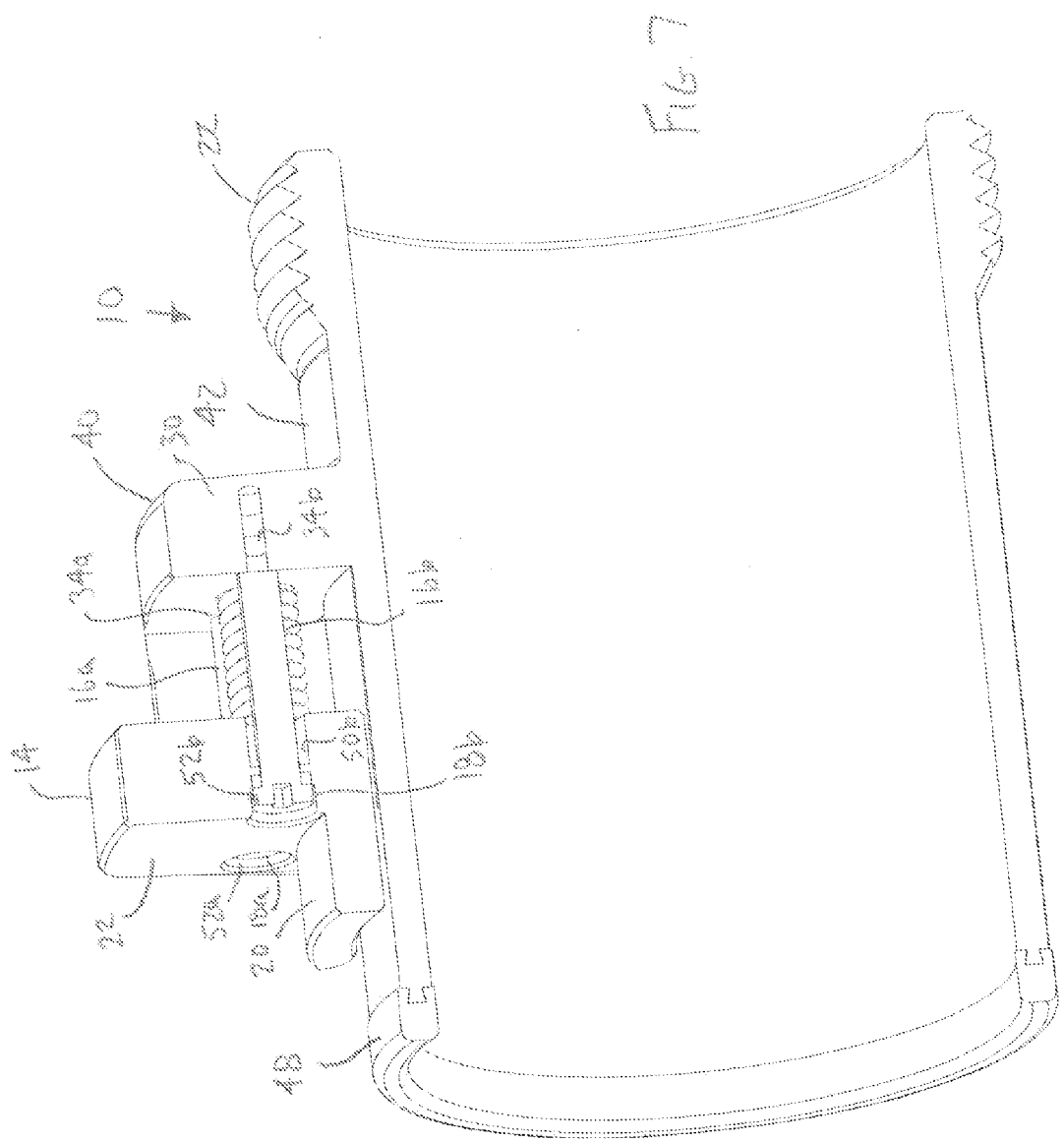

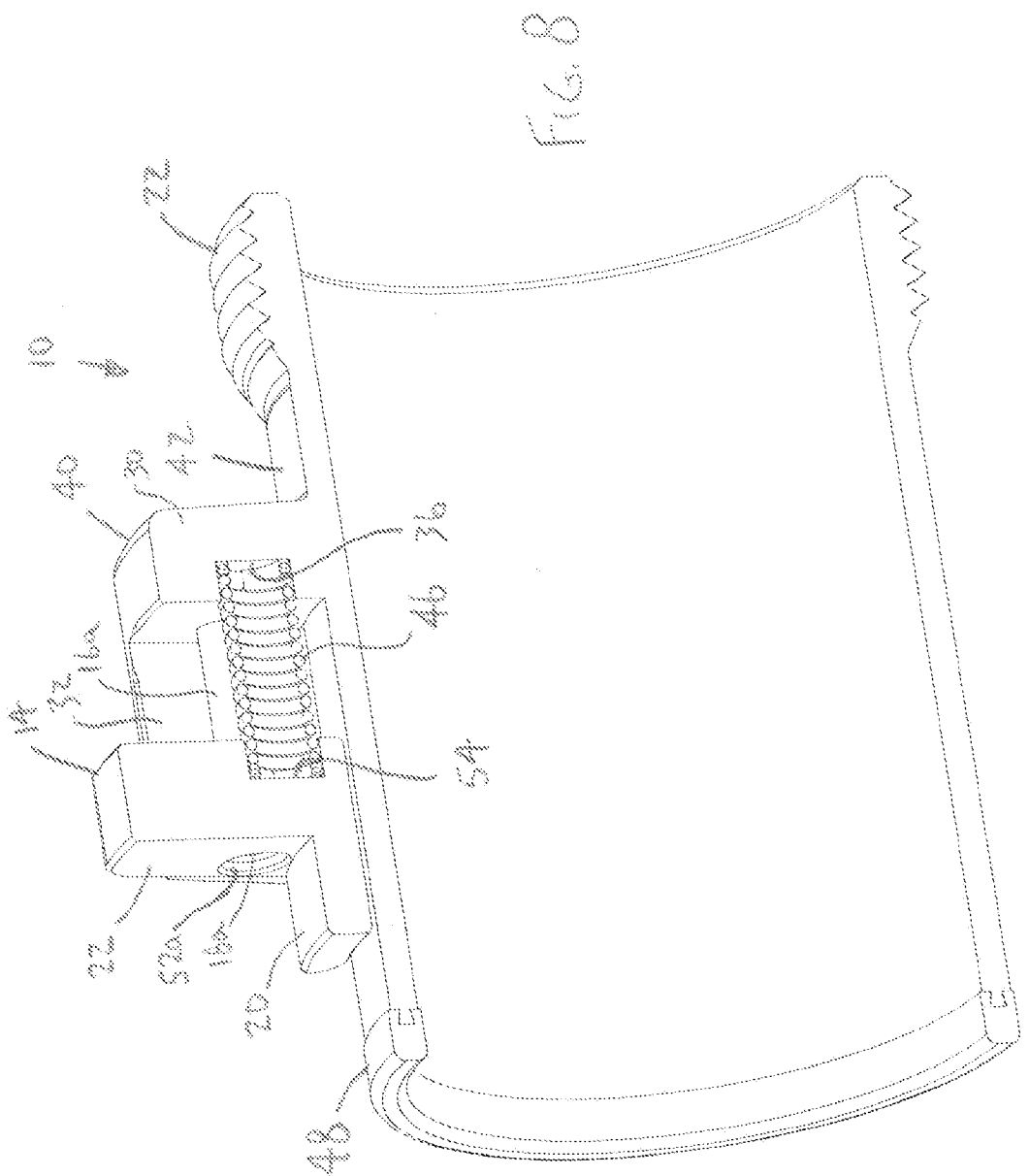

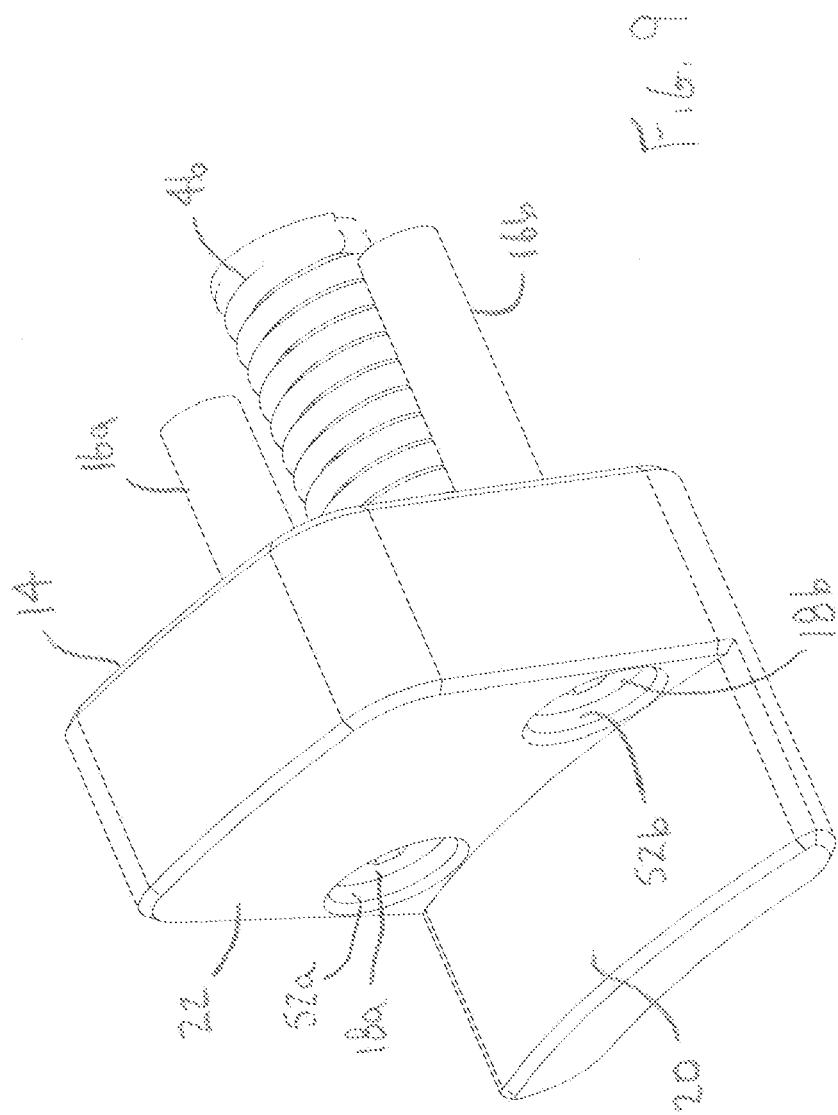

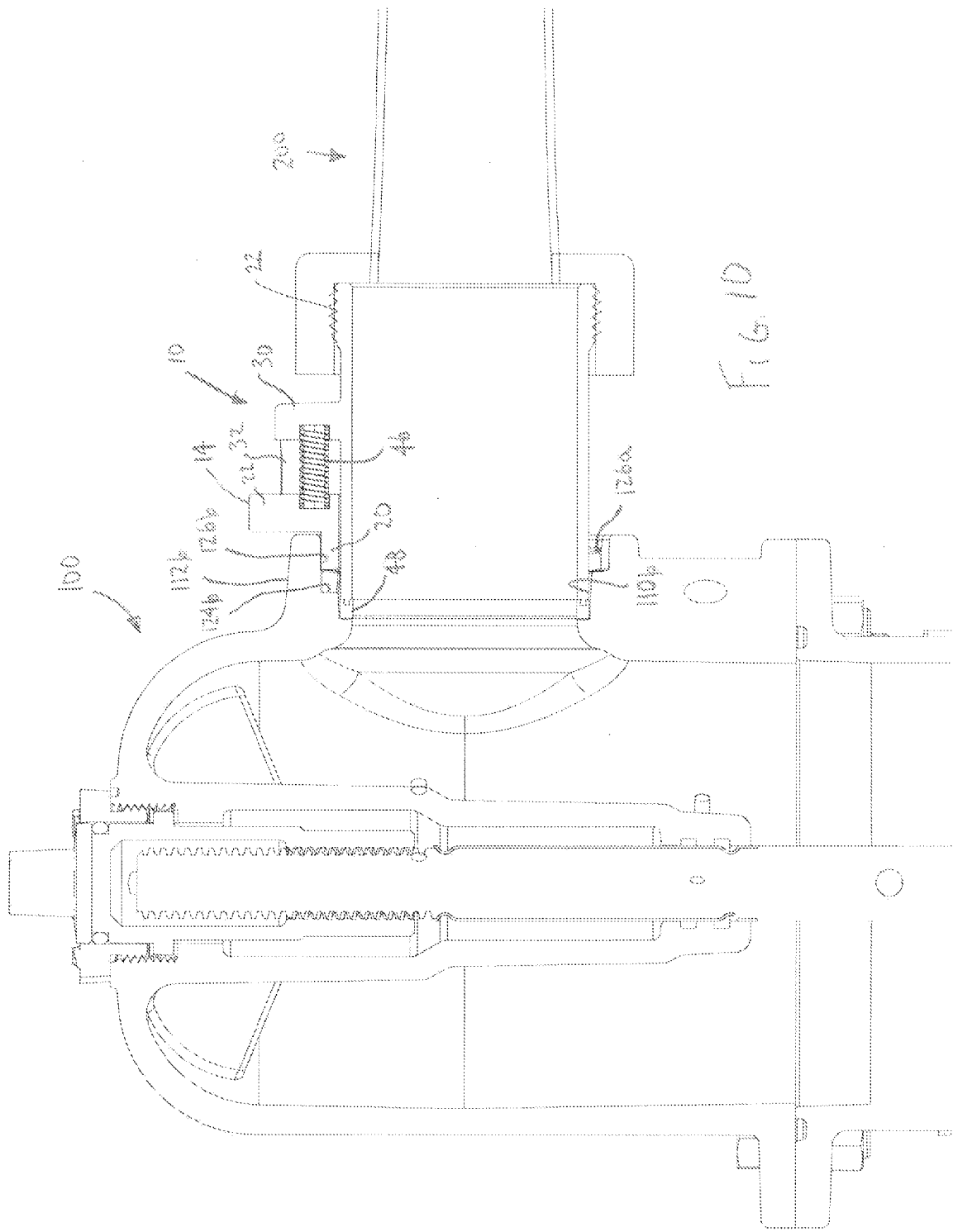

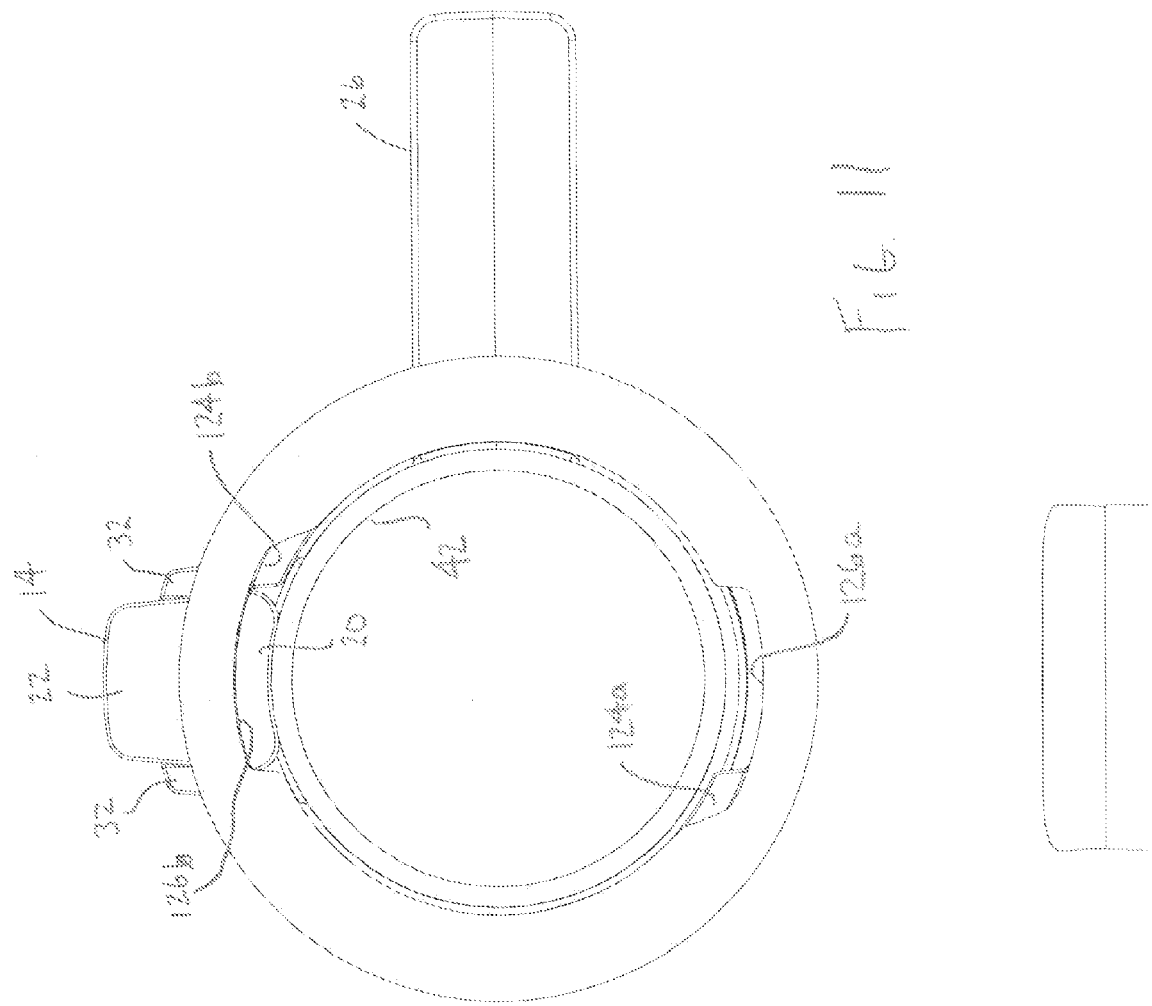

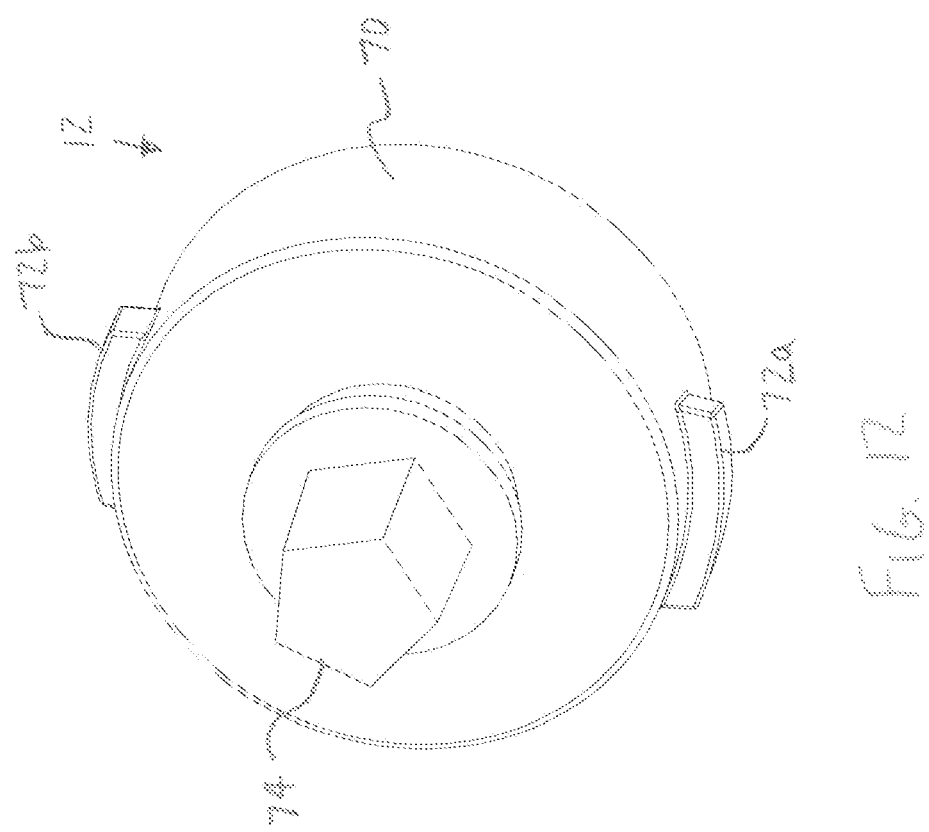

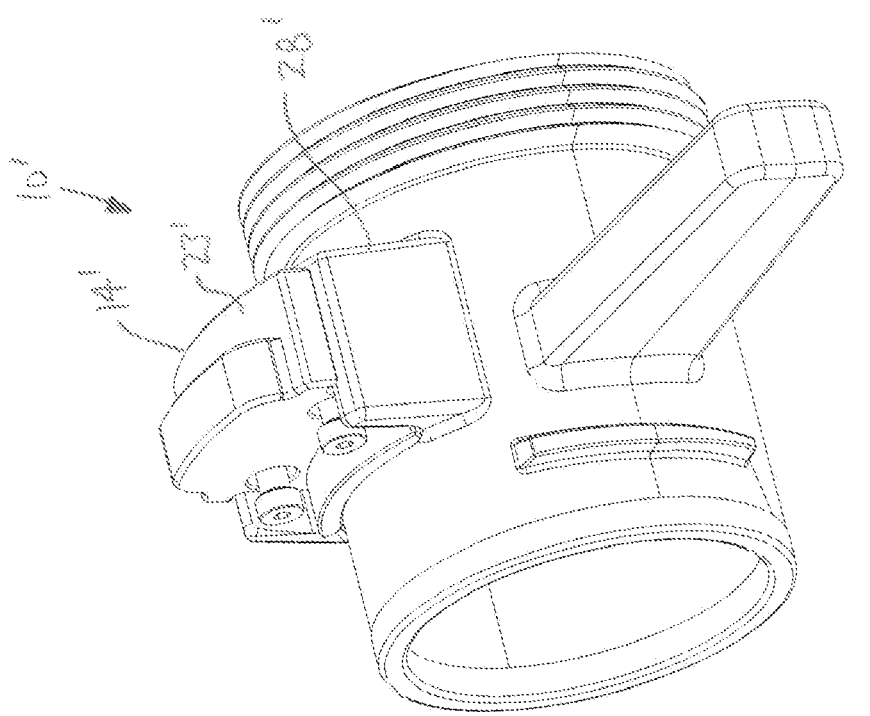

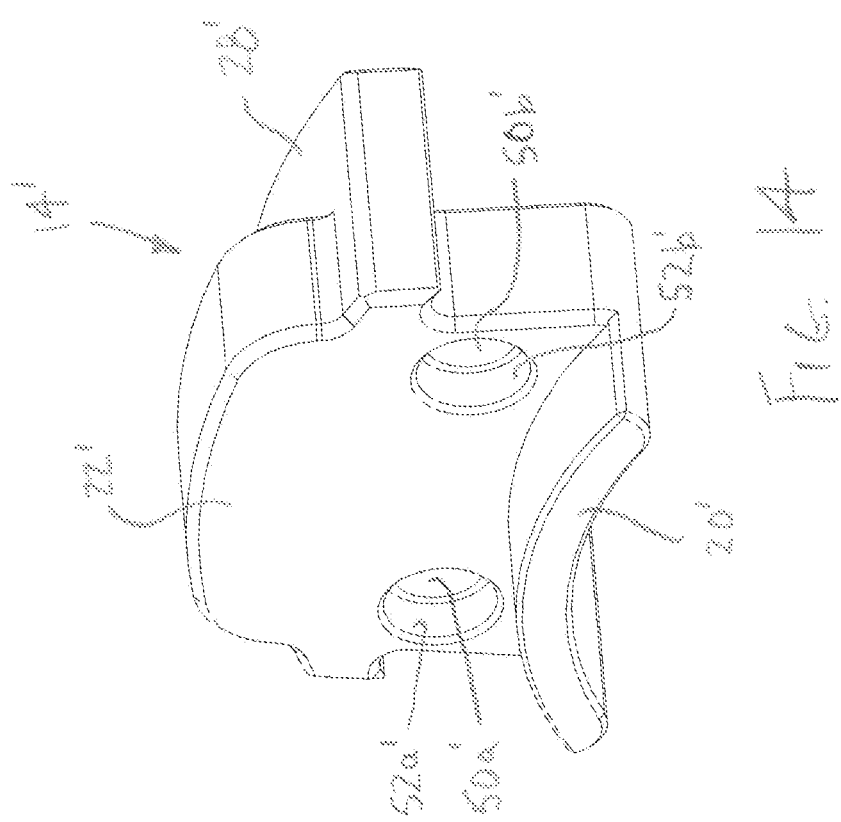

REMOVABLE FIRE HYDRANT NOZZLE WITH IMPROVED LOCKING STRUCTURE

BACKGROUND OF THE INVENTION

The present invention relates to fire hydrants and more specifically to nozzles for fire hydrants.

Fire hydrants are in widespread use across the United States and most major industrialized countries. A typical fire hydrant includes one or more nozzles for securing one or more fire hoses, pumper supply hoses or other accessories to the hydrant. A single hydrant may include nozzles of different sizes, such as hose nozzles and pumper nozzles. For example, a hydrant may include a hose nozzle that can receive one end of a fire hose to allow water to flow through the hose to the point of use, such as a fire. As another example, the hydrant may include a pumper nozzle that can receive one end of a pumper supply hose to allow water to be supplied to a pumper.

Many conventional fire hydrants include an upper standpipe and a bonnet that are exposed above ground. The upper standpipe may be bolted to a lower standpipe or other similar structure that provides a flow path from an underground water source. The bonnet is typically mounted to the top of the upper standpipe to close off its upper end and seat the hydrant's operating nut. With a conventional hydrant, the nozzle (or nozzles) is mounted in the upper standpipe and/or in the bonnet. Typically, one or more nozzle openings are formed through the upper standpipe and/or bonnet. To facilitate installation of a nozzle, each nozzle opening is typically cast or machined to provide an appropriate interface surface and is provided with some type of integrated interlocking structure to assist in securing the nozzle to the hydrant. For example, in some applications, the nozzle may be secured to the hydrant with a quarter-turn fitting. In those applications, the hydrant may be formed with integral quarter-turn structure surrounding each nozzle opening and the nozzles may be formed with integral quarter-turn lugs configured to operate with the quarter-turn structure surrounding each nozzle opening. During assembly of the hydrant, the nozzles may be installed in the nozzle openings by inserting the quarter-turn lugs of the nozzle into the quarter-turn structure surrounding the nozzle openings and rotating the nozzle until the quarter-turn fitting secures the nozzle. To lock the nozzle in the installed position, the nozzle may include one or more set screws that can be extended into set screw openings in the hydrant to prevent rotation of the nozzle with respect to the hydrant.

Hydrant nozzles are typically manufactured from copper alloy. With the current salvage value of copper alloy, municipalities are facing a growing number of nozzle thefts. Because many hydrants are located in public places readily accessible to would-be thieves, it can be difficult to prevent the removal and theft of nozzles. It can be difficult for a municipality to keep up with replacing nozzles that are stolen. To address this problem, some municipalities have begun to remove the nozzles from the hydrants when they are not in use. Although this helps to address the problem of theft, it creates the need for a simple and effective mechanism that quickly and securely secures a nozzle to a hydrant. It is undesirable for the nozzle to separate from the hydrant during use, particularly when the hydrant and hose are under pressure.

In view of the foregoing, at least one fire hydrant nozzle intended for removable use has been available in the market. This removable fire hydrant nozzle is intended for use with hydrants that have a conventional quarter-turn fitting to receive nozzles. With a conventional quarter-turn fitting, the nozzle includes a pair of opposed lugs that selectively interlock with a receptacle in the hydrant. The receptacle includes a pair of helical channels capable of receiving the lugs and a pair of opposed mouths that allow the lugs to be fitted into and removed from the channels. In use, the nozzle is installed by fitting the nozzle into the receptacle by pushing the lugs through the mouths into the channels. The nozzle is then turned approximately ninety degrees so that the lugs travel along the helical channels out of alignment with the mouths. Because of the helical configuration of the channels, the nozzle is drawn inwardly into tighter engagement with the receptacle as it is rotated toward the seated position. The removable nozzle includes a one-piece spring steel locking tab that interlocks with a lug mouth when the nozzle has been rotated into the fully installed position. It is necessary to manually hold the spring steel tab down while the nozzle is fitted into the receptacle. After insertion, the tab can be released by the operator. The need to manipulate the tab during installation makes the process somewhat cumbersome. The locking tab is installed on the nozzle in a location where it will automatically spring into the lug mouth when the nozzle has been rotated one-quarter turn into the installed position. Once it has engaged the lug mouth, the locking tab resists reverse rotation of the nozzle, which is necessary to remove the nozzle. To remove the nozzle from the hydrant, the operator must reach in, manually bend the spring steel locking tab back until it disengages from lug mouth and hold it in the disengaged position while rotating the nozzle.

SUMMARY OF THE INVENTION

The present invention provides a removable fire hydrant nozzle with a locking system. In one embodiment, the nozzle is intended for use with a fire hydrant having a nozzle seat that defines a nozzle opening and forms a female quarter-turn fitting. The nozzle seat defines a pair of helical locking channels and a pair of mouths that allow a pair of lugs from a male quarter-turn fitting to be inserted into the channels. The nozzle includes a locking arrangement having a movable slide that is configured to engage one of the mouths in the nozzle seat. The slide is spring loaded and is capable of axial movement between extended and retracted positions. In use, the slide automatically retracts as the nozzle is inserted into the nozzle seat and automatically moves into engagement with the mouth when the nozzle is rotated into the fully seated position. Once engaged, the slide prevents rotational movement of the nozzle with respect to the hydrant in either direction until it is manually disengaged. By preventing rotation of the nozzle, the slide effectively locks the nozzle in place on the hydrant.

In one embodiment, the locking arrangement includes a slide housing extending from the nozzle. A spring or other biasing element may be fitted between the slide and the housing to bias the slide in the extended position. In one embodiment, the rails include a pair of shoulder bolts that extend through the slide and are threaded to the housing. A coil spring may be fitted between the housing and the slide in the space between the bolts. As another option, a spring may be over each bolt to bias the slide. The housing may include a radial wall with a pair of axial walls extending inwardly from opposite ends of the radial wall. The axial walls may be configured to closely receive and shepherd movement of the slide with respect to the housing.

The slide may include a base and a paddle. The base may be configured to extend axially to provide a structure capable of engaging the mouth of the receptacle. The base may be sized and shaped to substantially occupy the full circumferential extent of the mouth. The paddle may extend radially outward from the base to provide a structure that is easily accessible to the operator. The slide may also include a skirt. If so, the skirt may extend from the paddle to provide a structure that covers the top of the housing to help enclose the rails and the spring.

In one embodiment, the nozzle includes an integrated seal. The seal may be fitted to the inner axial end of the nozzle to engage a seat within the receptacle. To facilitate installation, the seal may be capable of being snap-fitted onto the axial end of the nozzle. In one embodiment, the seal and inner axial end of the nozzle include mating dovetail features that allow the seal to snap onto the inner axial end. In addition or as an alternative, the seal may be glued to the inner axial end of the nozzle.

In one embodiment, the nozzle includes an integrated handle that facilitates installation and removal of the nozzle by a single operator. The handle may be integrally formed with the nozzle and may extend radially from the nozzle at a spacing of about ninety degrees from the housing. This orientation may facilitate installation and removal of the nozzle by a single individual.

In one embodiment, the outer end of the nozzle is configured to interface with the end of a fire hose or other accessory. For example, the outer end of the nozzle may have a standard male thread capable of mating with a standard female thread in a hose end coupler. As another example, the nozzle may have a standard Storz connector that allows the nozzle to be joined to other Storz connectors.

In another aspect, the present invention provides a nozzle cap that can be installed in the nozzle opening on the hydrant when the nozzle is removed. The nozzle cap may include the same interlocking structure provided on the nozzle, thereby allowing the nozzle cap to be installed without additional interlocking structure. For example, in applications that include a quarter-turn locking system, the nozzle cap may include lugs that interface with the quarter-turn fitting structure surrounding the nozzle opening. The nozzle cap may be configured to interlock with other interlocking structures as desired. The nozzle cap may be manufactured from materials with less resale value than copper alloy, such as polymer. The nozzle cap may define a through hole that allows water to pass through the nozzle cap when water pressure exists within the hydrant. As such, the through hole may provide a visual indication when water pressure builds up behind the cap.

The present invention provides a simple, effective and reliable locking system that can be easily incorporated into a nozzle that is capable of installation on pre-existing hydrants without modification to the hydrant. The locking system is stronger and more robust than previous systems that incorporate a spring-steel tab. The slide may be carried on one or more rails and be biased in an extended position so that it automatically locks when the nozzle is moved into the fully seated position. The slide is arranged to move in an axial direction and to operate automatically without operator intervention during installation. In addition to automatically locking when the nozzle becomes fully seated, the slide also automatically moves into the retracted position when the nozzle is fitted into the mouth. The base of the slide may extend the full width of the mouth in which it will be mounted, thereby opposing both clockwise and counter-clockwise movement of the nozzle. The slide may include a paddle that spans the full width of slide and extends outwardly to provide a large and readily accessible structure that allows the operator to manipulate the slide with a single hand. The nozzle may include an integrated handle that facilitates tool-free installation and removal of the nozzle on the hydrant. The single-handed slide and integrated handle combine to allow the nozzle to be easily removed by a single person. More specifically, an operator can disengage the slide with one hand and rotate the nozzle using the handle with the other. The slide housing and handle can be integrally formed with the nozzle body to provide a more robust construction.

These and other objects, advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 2 is an enlarged perspective view of a portion of the fire hydrant of FIG. 1 with the hose removed.

FIG. 3 is an enlarged perspective view of a portion of the fire hydrant of FIG. 1 with the hose removed and the nozzle cap removed to show the nozzle opening and surrounding mounting structure.

FIG. 4 is a top right perspective view of a nozzle incorporating a locking system according to an embodiment of the present invention.

FIG. 5 is a top plan view of the nozzle with the slide extended.

FIG. 6 is a front view of the nozzle.

FIG. 7 is a first sectional view of the nozzle.

FIG. 8 is a second sectional view of the nozzle.

FIG. 9 is a perspective view of the slide assembly.

FIG. 10 is a first sectional view of a portion of the hydrant with the nozzle installed.

FIG. 11 is a second sectional view of a portion of the hydrant with the nozzle installed.

FIG. 12 is a perspective view of a nozzle cap.

FIG. 13 is a perspective view of a nozzle in accordance with an alternative embodiment.

FIG. 14 is a perspective view of the slide of the alternative embodiment.

DESCRIPTION OF THE CURRENT EMBODIMENT

I. Overview

Figure 1:
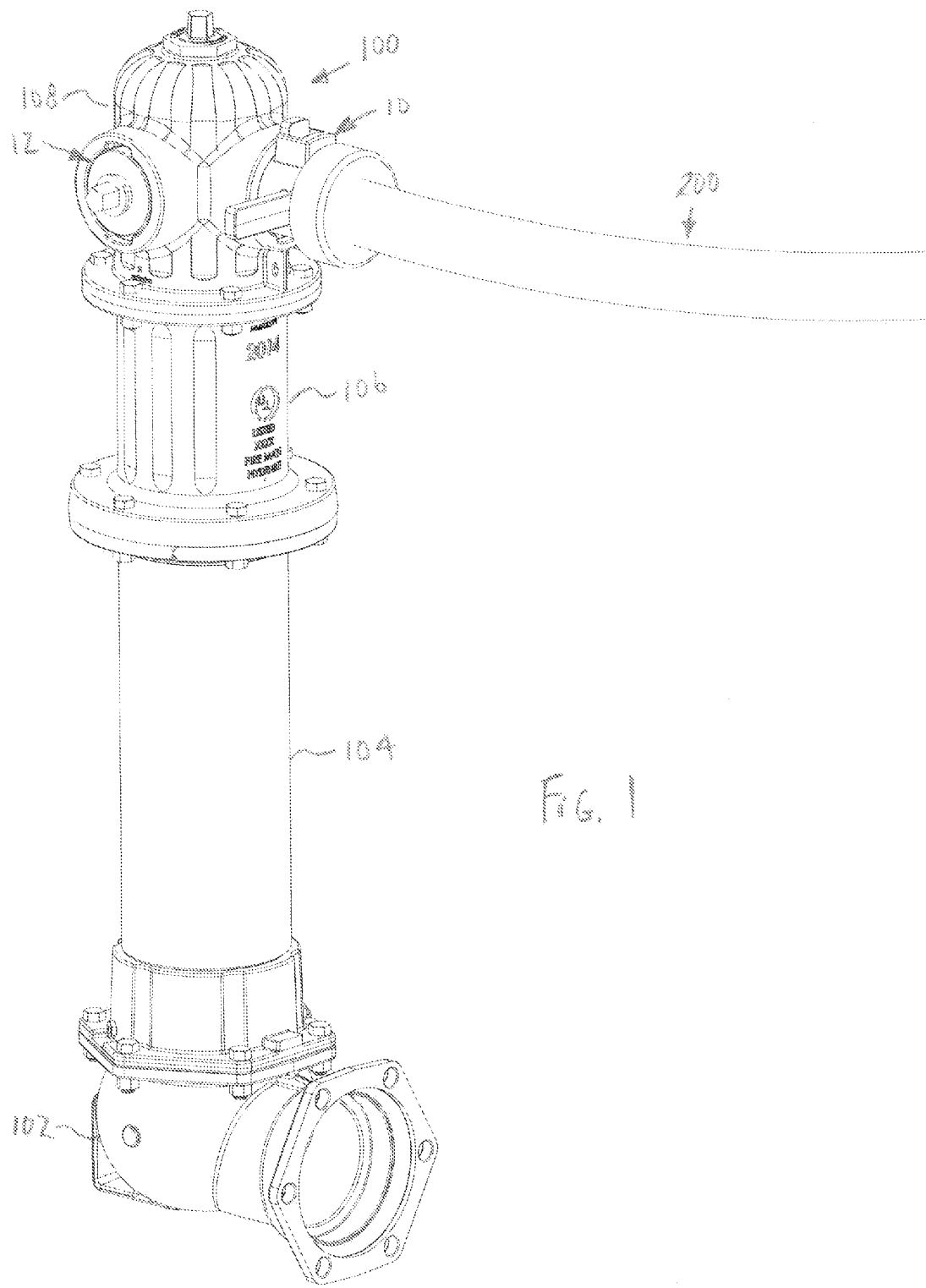
FIG. 1 is a perspective view of a fire hydrant upon which is installed a nozzle and hose according to an embodiment of the present invention.

A fire hydrant 100 incorporating a nozzle 10 with a locking system in accordance with an embodiment of the present invention is shown in FIGS. 1-3. The fire hydrant 100 of this embodiment includes a pair of nozzle openings 110a-b configured to allow the installation of up to two nozzles that may supply water to various articles, such as fire hoses or pumper hoses 200. In this embodiment, nozzle opening 110a is fitted with a nozzle cap 12 and nozzle opening 110b is fitted with a nozzle 10 in accordance with an embodiment of the present invention. When not fitted with a nozzle 10, nozzle opening 110b may also be fitted with a nozzle cap 12. The nozzle 10 of the illustrated embodiment generally includes a nozzle body 42, a handle 26 to facilitate rotation of the nozzle 10, a locking arrangement 40 to selective lock the nozzle 10 to the hydrant 100 in the installed position and a seal 48 to provide a leak-tight interface between the nozzle 10 and the hydrant 100. As with a conventional nozzle, one end of nozzle 10 is configured to mount to a fire hydrant and the other is configured to mount to an article that will receive the flow of water, such as fire hoses or pumper hoses 200. The nozzle 10 is intended to be easily installed on the hydrant 100 only when needed, thereby allowing an end to the typical practice of installing nozzles in the hydrant and leaving them in place on the hydrant even when the hydrant is not in use. The nozzle openings 110a-b each include interlocking structure that allows a nozzle 10 or a nozzle cap 12 to be fitted into the nozzle opening 110a-b. The interlocking structure of the illustrated embodiment is a conventional quarter-turn fitting. As such, the nozzle openings 110a-b each include a female quarter-turn fitting, and the nozzle 10 and the nozzle cap 12 each include a corresponding male quarter-turn fittings. The nozzle 10 includes a locking arrangement 40 that locks the nozzle 10 in the installed position to resist unintended release of the nozzle 10 from the hydrant. The locking arrangement has a movable slide 14 that automatically retracts as the nozzle 10 is installed and automatically interlocks with mounting structure around the nozzle opening 110a-b when the nozzle 10 becomes fully seated. Once interlocked, the slide 14 prevents rotational movement of the nozzle 10 with respect to the hydrant 100. This effectively locks the nozzle 10 in place by preventing it from being rotated out of the fully seated position. The slide 14 can be manually disengaged from the mounting structure when it is desirable to remove the nozzle 10 from the hydrant 100. Because the slide 14 engages pre-existing mounting structure on the hydrant 100, the locking system of the present invention can be implemented without the need for any modifications to the hydrants 100. The integral handle 26 facilitates installation and removal of the nozzle 10 by a single operator.

The present invention is described with reference to various illustrations. Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to packages of any specific orientation(s).

II. Hydrant

For purposes of disclosure, the present invention is described primarily in the context of a conventional fire hydrant 100. The present invention may, however, be used in connection with other types of hydrants. For example, with the illustrated embodiment, the nozzle openings are contained in the bonnet. A nozzle 10 with a locking arrangement according to an embodiment of the present invention may be used with a fire hydrant having nozzle openings disposed elsewhere, such as in the upper standpipe. As another example, the nozzle openings are sized to receive a pumper hose, but the present invention be incorporated into nozzles of different sizes. Because the illustrated fire hydrant 100 is a generally conventional, it will be described in limited detail. Suffice it to say that the hydrant 100 generally includes an inlet 102, a lower standpipe 104, an upper standpipe 106 and a bonnet 108, and defines a plurality of nozzle openings 110a-b. In the illustrated embodiment, the hydrant 100 includes a pair of conventional pumper nozzle openings 110a-b, which are oriented at ninety degrees to one another. In this application, the nozzle 10 is sized and shaped to be fitted into a pumper hose nozzle opening. As noted above, the nozzle openings 110a-b, nozzle 10 and nozzle cap 12 utilize corresponding quarter-turn fittings. They may, however, use essentially any other suitable connecting structure. For example, a nozzle incorporating the locking system of the present invention may alternatively be scaled to interfit with a pumper nozzle. Although the present invention is described primarily in connection with a fire hydrant having nozzle openings in the bonnet 108, it may be incorporated into essentially any type of hydrant having nozzle openings in essentially any location, such as in the bonnet and/or the upper standpipe. Although the present invention is described in the context of one type of conventional fire hydrant, the present invention may be used with essentially any type of fire hydrant that can include a removable nozzle—conventional or otherwise.

To facilitate installation and removal of the nozzles 10, each nozzle opening 110a-b in the hydrant 100 is surrounded by a nozzle seat 112a-b that includes a connecting structure 120 for securing a nozzle 10 or nozzle cap 12 to the hydrant 100. The connecting structure 120 of this embodiment is a quarter-turn fitting. As such, the nozzle seat 112a-b is, in this embodiment, shaped to provide a female quarter-turn fitting 122. FIG. 3 is enlarged view of the hydrant 100 showing nozzle seat 112a surrounding nozzle openings 110a. The other nozzle seat 112b is essentially identical to illustrated nozzle seat 112a, and is therefore not separately described. As perhaps best shown in FIG. 3, the female quarter-turn fitting 122 includes a pair of helical channels 124a-b that receive lugs 24a-b carried by the nozzle 10 (described below in more detail). The channels 124a-b are helical so that rotation of the nozzle 10 within the female quarter-turn fitting 122 in the locking direction (e.g. counter-clockwise) draws the nozzle 10 inwardly into tight engagement with the nozzle seat 130 to create a leak-tight seal. As described in more detail below, a compression seal 48 may be fitted onto the inward axial end of the nozzle 10 to interact with a shoulder in the nozzle seat 130 to create the leak-tight seal. The quarter-turn fitting 122 of this embodiment includes a pair of mouths 126a-b to allow the lugs 24a-b of a male quarter-turn fitting to be inserted into and removed from the channels 124a-b (see FIG. 5). Each mouth 126a-b may be disposed adjacent the outer end of the corresponding channel 124a-b so that the lugs 24a-b are inserted into and removed from the appropriate end of the channels 124a-b. In the illustrated embodiment, each mouth 126a-b is defined by a radially-extending slot 128a-b of sufficient size to allow a lug 24a-b to pass through the slot 128a-b into the underlying channel 124a-b.

In use, existing hydrants can be fit with nozzles 10 and nozzle caps 12 in accordance with the present invention simply by uninstalling any existing conventional nozzles and replacing them with a nozzle 10 or nozzle caps 12. When it is desirable to use a hydrant, the nozzle caps 12 may be removed and replaced with nozzles 10. If desired, a nozzle 10 may be fitted to and kept on the end of a fire hose, pumper hose or other water device so that the device may be quickly attached to a hydrant 100 without the need to separately attach the nozzle 10 to the device. In situations where use of all nozzles is not immediately necessary, a nozzle 10 fitted to a valve (rather than a hose or other accessory) may be installed in the unused nozzle openings 110a-b. If it becomes desirable to use an additional nozzle, the hose or other water device can be install on the valve outlet and the valve can be opened to allow water to flow to the new hose or accessory. Although not shown, the valve may be a conventional valve that includes male and female threaded ends to interface with the nozzle 10 on one-side and a hose or other accessory on the other side. For example, the female threaded fitting may be configured to fit within the male threaded fitting on the downstream side of the nozzle 10, and the male threaded fitting may be configured to receive a hose or other accessory that has a female threaded fitting. Alternatively, the nozzle 10 may be permanently secured to the end of a hose or other accessory. For example, the end of a fire hose may include a permanently installed nozzle with a locking system in accordance with an embodiment of the present invention.

III. Nozzle

A nozzle 10 in accordance with an embodiment of the present invention is shown in FIGS. 4-8. The nozzle 10 of the illustrated embodiment generally includes a nozzle body 42, a handle 26 to facilitate rotation of the nozzle 10, a locking arrangement 40 to selective lock the nozzle 10 to the hydrant 100 in the installed position and a seal 48 to provide a leak-tight interface between the nozzle 10 and the hydrant 100. The nozzle body 42 is a generally tubular structure having a hydrant connecting structure 20 on one end for securing the nozzle 10 to the hydrant 100 and an outlet connecting structure 22 on the other end for securing accessories to the nozzle 10, such as fire hoses and pumper hoses. As noted above, the hydrant connecting structure 20 of the illustrated embodiment is a male quarter-turn fitting that is configured to interface with a corresponding female quarter-turn fitting 122 in the hydrant 100. In this embodiment, the male quarter-turn fitting includes a pair of lugs 24a-b that are received in and travel through corresponding channels 124a-b in the hydrant 100. The number, size, shape and configuration of the lugs 24a-b may vary from application to application. Although illustrated with a quarter-turn fitting, the present invention is not limited to use with quarter-turn fittings. Rather, the present invention may be incorporated into systems that include almost any interlocking structure between the nozzle and the hydrant and between the nozzle and the hose (or other accessory). For example, the hydrant connecting structure 20 may include essentially any conventional or "quick" connection fittings, such as the quarter-turn fitting described above, a Storz connection fitting and other types of "bayonet" fittings.

The outlet connecting structure 22 is intended to allow hoses (e.g. fire hoses, pumper hoses) and other accessories (e.g. valves) to be connected to the hydrant 100. In the illustrated embodiment, the second connecting structure 22 is a conventional male threaded fitting that is selected to correspond with a corresponding female threaded fitting in hoses and other accessories. The male threaded fitting may includes a single thread 42 that spirals around the outer surface of the nozzle 10. Although illustrated with a generally conventional threaded fitting, the present invention is not limited to nozzles that incorporate conventional threaded fittings. Instead, the nozzle may be configured to connect to hoses and other accessories using almost any interlocking structure capable of intersecuring the two components. For example, the outlet connection structure 22 may be any fire hose interface, including threads of all sizes and thread forms as well as Storz or other quick hose connection types. If desirable, the second connecting structure 22 may be a substantially permanent connection between the nozzle 10 and the hose or other accessories. As noted above, the present invention allows the nozzle 10 to be removed from the hydrant 100 when not in use. Because the nozzle 10 is being removed when not it use, it may be desirable in some application for it to remain connected to a hose or other accessory.

As perhaps best shown in FIG. 4, the nozzle 10 includes a handle 26 that extends radially from the nozzle body 42. In the illustrated embodiment, the handle 26 is formed integrally with the nozzle body 42. For example, the nozzle body 42 and handle 26 may be cast together as a single integral unit. Alternatively, the handle 26 may be separately formed and affixed to the nozzle body 42. If separately formed, the handle 26 may be permanently affixed to the nozzle body 42, for example, by welding, or it may be temporarily affixed to the nozzle body 42, for example, by fasteners or other connecting structures. In the illustrated embodiment, the handle 26 is configure to extend radially from the nozzle body 42 at a location spaced about ninety degrees from the locking arrangement (discussed below). The size, shape and configured of the handle 26 may vary as desired. For example, the length of the handle 26 may vary depending on the amount of force required to install and remove the nozzle 10.

As discussed above, the nozzle 10 includes a locking arrangement 40 for locking the nozzle 10 in place on the hydrant 100 (See, e.g., FIGS. 4-6). In the illustrated embodiment, the locking arrangement 42 generally includes a slide housing 28, a slide 14, guide rails 16a-b and a spring 46. The slide 14 is movably mounted within the slide housing 28 on guide rails 16a-b. The slide 14 is movable between extended and retracted positions, and is biased in the extended position by the spring 46. The slide housing 28 of the illustrated embodiment is formed integrally with the nozzle body 42 and includes a radial wall 30 and a pair of axial walls 32. Although formed integrally in the illustrated embodiment, the slide housing 28 may be separately formed and affixed to the nozzle 10, if desired, for example, by welding or fasteners. In the illustrated embodiment, the radial wall 30 provides a structure for mounting guide rails 16a-b that support and shepherd movement of the slide 14. In this embodiment, the rails 16a-b include a pair of bolts that are threadedly engaged with the radial wall 30 (See FIG. 7). The bolts 16a-b may be shoulder bolts. As shown, the radial wall 30 of the illustrated embodiment defines two threaded bolt holes 34a-b configured to receive the threaded ends of the bolts 16a-b. In the illustrated embodiment, the bolt heads 18a-b retain the slide 14 preventing it from slipping off of the ends of the bolts 16a-b. The radial wall 30 may define a bore 36 configured to receive the spring 46 (See FIG. 8). In the illustrated embodiment, the locking arrangement includes a single, centrally-located spring 46, and accordingly, a single, centrally-located bore 36. FIG. 9 shows an assembly including the slide 14, rails 16a-b and spring 46.

The axial walls 32 extend from opposite ends of the radial wall 30 and are configured to closely receive the slide 14 through the entire range of motion of the slide 14. In the illustrated embodiment, the axial walls 32 are inclined inwardly toward one another as they extend from the nozzle 10. As a result, they cooperatively help to resist radially outward movement of the slide 14 with respect to the nozzle 10. The axial walls 32 may vary in size, shape and configuration from application to application. For example, the axial walls 32 need not be inclined. As another example, the axial walls 32 may include contours that interlock the slide 14 with the axial walls 32. In some applications, the axial walls 32 may not be eliminated.

Although not shown, the slide housing 28 may be provided with one or more drain holes that allow water to drain. The drain hole(s) may be located toward the bottom of the radial wall 30 and/or the axial walls 32. When included, the drain hole(s) help to prevent water from pooling and freezing in cold weather.

The slide 14 generally includes a base 20 and a paddle 22. The base 20 extends in the axial direction so that it can be fitted into a lug mouth 126a-b in the hydrant seat 112a-b. In the illustrated embodiment, the size, shape and configuration of the base 20 is selected so that it substantially fills an entire lug mouth 126a-b. As shown, the base 20 of the illustrated embodiment is curved to follow the outer circumference of the nozzle 10 and corresponds in circumferential width with the lug mouths 126a-b. As a result, when the base 20 is interfitted with the mouth 126a-b, interaction between the two components prevents rotation of the nozzle 10 with respect to the hydrant 100 in either the clockwise or counter-clockwise direction. The paddle 22 extends upwardly from the base 20 and provides a structure for operating the slide 14. The paddle 22 may be essentially the same width of the base 20 and may extend radially outward a sufficient distance to clear the nozzle seat 112a-b and provide a structure that is readily accessible to an operator. The paddle 22 of the illustrated embodiment includes a pair of though-bores 50a-b configured to receive the bolts 16a-b. The through-bores 50a-b may include counter-bores 52a-b that are of sufficient diameter and depth to recess the heads 18a-b of the bolts 16a-b (See FIG. 7). The paddle 22 may also define a bore 54 that functions as a spring seat 54 to receive an end of spring 46 (See FIG. 8). In the illustrated embodiment, bore 54 and bore 36 are coaxially aligned.

As noted above, a seal 48 may be mounted to the inner axial end of the nozzle body 42. The seal 48 and nozzle body 42 may include mating dovetail features that allow the seal 48 to snap onto the inner axial end of the nozzle body 42 (See FIG. 10). In addition or as an alternative, the seal 48 may be glued to the inner axial end of the nozzle body 42. The seal 48 may be manufactured from essentially any material capable of providing a leaktight seal. For example, the seal 48 may be a dual durometer EPDM material that is capable of undergoing 30% compression without permanent deformation.

In the illustrated embodiment, the nozzle body 42, handle 26 and slide housing 28 are integrally formed as a single unitary structure. This single unitary structure may be manufactured using essentially any suitable techniques and apparatus. For example, the unitary structure may be cast (e.g. die cast or mold cast) from aluminum and machined as needed. In the illustrated embodiment, the unit is formed from aluminum and is hard coated to prevent wear. The nozzle body 42 may be hard coated using essentially any hard coating procedure. For example, the nozzle body 42 may be hard coated using a conventional electrochemical process.

In an alternative embodiment shown in FIGS. 13 and 14, the nozzle 10' may have a locking arrangement with a slide 14' having a skirt 23' that covers the rails and spring. FIG. 13 shows the slide 14' in the retracted position. In this alternative embodiment, the slide 14' is generally identical to slide 14, except that it includes the skirt 23'. To facilitate disclosure, the slide 14' has been provided with references numerals that generally correspond with those of the slide 14, except that they are preceded by the prime symbol. As can be seen in FIG. 13, the skirt 23' is sized and shaped to close the top of the slide housing 28' through the entire range of motion of the slide 14'.

In use, the skirt 23' may help to prevent items from entering the interior of the housing 28' where they might interfere with movement of the slide 14'. It may also help to prevent the operator or the operator's clothing from being pinched between the slide 14' and slide housing 28' during operation.

FIGS. 10 and 11 are cross sectional views of the illustrated embodiment that help to show the interrelationship of the various components of the hydrant 100 and the nozzle 10. FIG. 10 is a cross-sectional view showing the slide 14 in the extended position fitted into the mouth 126b of the hydrant 100. This illustration shows, among other things, the axial length of the base 20, the radial height of the paddle 22 and the interrelationship between the seat 112b and the seal 48. As shown, the base 20 extends into the mouth 126b a sufficient distance to create a secure interlock. It is also short enough so that it disengages from the mount 126b when the slide 14 is moved into the retracted position (Although illustrating an alternative embodiment, FIG. 13 shows the slide 14' in the retracted position). The axial length of the base 20 may vary from application to application as desired. The paddle 22 extends above the material surrounding the nozzle opening 110b a sufficient distance that it can be easily manipulated by an operator. The size, shape and configuration of the paddle 22 may vary from application to application. FIG. 11 is a second cross-sectional view showing the base 20 of the slide 14 fitted into the mouth 126b. As can be seen, the base 20 extends the full width of the mouth 126b and is curved to follow the circumferential shape of the nozzle 10 and the mouth 126b. The configuration of the base 20 may vary from application to application. For example, the base 20 need not extend the full width of the mouth 126b, but may instead extend only partially across the width. As another example, the base 20 need not be a single continuous component. Instead, the base 20 may include two or more separate protrusions that are capable of extending into the mouth 12a. In one alternative embodiment, the base 20 may include two separate protrusions (not shown) disposed at opposite ends of the mouth.

FIGS. 1-3 and 10-11 show a nozzle 10 installed in nozzle seat 112b of hydrant 100. Installation of a nozzle in the other nozzle seat 112a is essentially identical and therefore will not be described in detail. In alternative embodiments, the nozzle seats may be of different sizes and therefore may be configured to receive nozzles of different sizes. Referring now to FIG. 8, the nozzle 10 of this embodiment is installed in the nozzle seat 108 using a generally conventional quarter-turn fitting. The lugs 24a-b are captured in the channels 124a-b. The locking slide 14 extends into and substantially fills mouth 126a, thereby interlocking and preventing rotation of the nozzle 10 with respect to the nozzle seat. When the nozzle 10 is installed, the paddle 22 extends radially outwardly beyond the outer extent of the nozzle seat where it is readily accessible to a user (see FIG. 9). Although the illustrated embodiment shows a single locking arrangement engaging one of the two mouths 126a-b, the nozzle 10 may alternatively include two locking arrangements that are spaced 180 degrees apart so that a separate locking slide 14 can engage each mouth 126a-b.

In this embodiment, the nozzle 10 is installed in the nozzle seat 108 using essentially the same steps used to connect a conventional quarter-turn fitting. The nozzle 10 is coaxially aligned with the nozzle seat 112b with the lugs 24a-b aligned with the lug mouths 126a-b in the nozzle seat 112b. The nozzle 10 is then moved axially into the nozzle seat 112b, thereby causing the lugs 24a-b to path through the mouths 126a-b into the channels 124a-b. In the illustrated embodiment, this motion also cause the slide 14 to retract into the slide housing 28. More specifically, as the nozzle 10 is moved axially into the nozzle seat 112*b*, the inward end of the base 20 of the slide 14 engages the face of the nozzle seat 112*b*. Further axial movement causes the slide 14 to increasingly retract into the slide housing 28, thereby compressing the spring 46. Once the nozzle 10 is fully inserted in the nozzle seat 112*b* in the axial direction, the nozzle 10 is rotated using the handle 26 in a counter-clockwise direction, thereby causing the lugs 24*a-b* to travel along the channels 124*a-b*. Because this is a quarter-turn fitting, the nozzle 10 is rotated counter-clockwise ninety degrees to bring it into the fully seated position. As noted above, the channels 124*a-b* are helically inclined so that movement of the lugs 24*a-b* through the channels 124*a-d* draws the nozzle 10 into tighter axial engagement with the nozzle seat 108. As noted above, a compression seal 48 fitted onto the end of the nozzle 10 may be used to facilitate a leaktight connection between the nozzle 10 and the nozzle seat 108. As the nozzle 10 reaches the end of its ninety degree rotation, the slide 14 will come into full alignment with one of the two mouths 126*a-b*. Given the force provided by spring 46, the slide 14 will automatically move into the mouth 126*a* once possible. The slide 14 is positioned on the nozzle 10 so that it will clear the nozzle seat 112*b* and enter the mouth 126*a* just as the nozzle 10 becomes fully seated in the nozzle seat 112*b*. The interaction of the slide 14 with the mouth 126*a* resists both clockwise and counter-clockwise rotation of the nozzle 10. Given that clockwise rotation of the nozzle 10 is required to remove the nozzle 10 from the hydrant 100, the slide 14 must be disengaged before the nozzle 10 can be removed. To remove the nozzle 10 from the nozzle seat 108, a user operates the paddle 22 to disengage the slide 14 from the hydrant 100. In the illustrated embodiment, the paddle 22 is moved axially outward to retract the slide 14 into the housing 58. As the slide 14 moves outwardly into the housing 58, the base 20 becomes disengaged from the mouth 126*a*, thereby allowing rotational movement of the nozzle 10. While the slide 14 is held in the retracted position, the nozzle 10 can be rotated using the handle 26 in a clockwise direction to disengage the quarter-turn fitting.

As can be seen, the present invention provides a nozzle with a locking slide that can be used to quickly and easily secure the nozzle in place on the hydrant. The illustrated embodiments show a locking slide that is configured to require no operator interaction during installation and to require only simple one-handed action during removal.

As noted above, the present invention may also provide a nozzle cap 12 for closing the nozzle openings 106*a-b* when nozzles 10 are not installed (See FIGS. 1, 2 and 12). In the illustrated embodiment, the cap 12 is configured to mount in the nozzle seats 108 in the same manner as the nozzles 10. More specifically, the cap 12 may include a male quarter-turn fitting configured to be fitted into the female quarter-turn fitting in the nozzle seat 108. In this embodiment, the cap 12 generally includes a main body 70, a pair of lugs 72*a-b* and a head 74. The main body 70 is generally disc-shaped and is sized to be fitted within the corresponding nozzle opening 106*a-c*. In typical applications, the cap 12 may come in two sizes—one size to fit over a pumper nozzle opening and a second size to fit over a hose nozzle opening. The lugs 72*a-b* are sized, shaped and otherwise configured to interface with the quarter-turn fitting in the corresponding nozzle seat 108. The head 74 provides a structure for rotating the cap 12 during installation and removal. In this embodiment, the head 74 is a pentagon head, but the cap 12 may be provide with other structure to facilitate installation and removal. For example, the pentagon-shaped head may be replaced by a hex head, a square head or by another head configured to operate only with a special tool. FIG. 2 shows the nozzle cap 12 seated in the nozzle seat 112*a*. The lugs 72*a-b* of the nozzle cap 12 are seated in channels 124*a-b* to hold the nozzle cap 12 in place. In the illustrated embodiment, the nozzle cap 12 is manufactured from a polymer, but it may be manufactured from other suitable materials, if desired. The nozzle cap 12 may include a through hole 76 that extends axially through the main body 70. The through-hole 76 may allow water to pass from behind the nozzle cap 12 if water pressure builds within the hydrant 100. The passage of water through the through-hole 76 can provide a visual indication when water pressure exists within the hydrant 100. For example, if a user opens the main valve to allow water to flow into the hydrant 100 without removing all of the caps 12, the water pressure will cause water to squirt out from inside the hydrant 100 through the through-hole 76.

The above description is that of current embodiments of the invention. Various alterations and changes can be made without departing from the spirit and broader aspects of the invention. This disclosure is presented for illustrative purposes and should not be interpreted as an exhaustive description of all embodiments of the invention or to limit the scope of any claims that may issue to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims.

The embodiments of the invention in which an exclusive property or privilege is claimed are defined as follows:

1. A removable hydrant nozzle comprising:
 a nozzle body extending along an axis, a hydrant connector toward one axial end and an outlet connector toward a second axial end;
 a locking arrangement disposed on said nozzle body, said locking arrangement including:
  a slide housing extending from said nozzle body;
  a slide movably mounted to said slide housing, said slide having a base and a paddle, said slide capable of movement in an axial direction between an extended position and a retracted position; and
  a biasing element for biasing said slide in said extended position.

2. The nozzle of claim 1 wherein said locking arrangement includes at least one rail fixed to said housing, said slide movably mounted to said rail.

3. The nozzle of claim 1 wherein said locking arrangement includes a pair of bolts, said bolts extend through said slide and threadedly engaged with said slide housing.

4. The nozzle of claim 3 wherein each of said bolts includes a head, said slide defining a pair of counterbores configured to receive said bolt heads when said slide is in said extended position.

5. The nozzle of claim 4 wherein said base corresponds in width to a width of a mouth of a standard quarter-turn fitting.

6. The nozzle of claim 3 wherein said biasing element in a spring disposed between said slide and said housing.

7. The nozzle of claim 3 wherein said biasing element is a coil spring fitted between said slide and said housing.

8. The nozzle of claim 7 wherein said slide defines a first spring seat receiving one end of said coil spring and said housing defines a second spring seat receiving an opposite end of said coil spring.

9. The nozzle of claim 1 further including an integrated handle, said handle extend radially outward from said nozzle body.

10. A hydrant assembly comprising:
a hydrant having a nozzle seat, said nozzle seat including a female quarter turn fitting;
a nozzle installed within said nozzle seat, said nozzle including:
a nozzle body extending along an axis, a hydrant connector toward one axial end and an outlet connector toward a second axial end, said hydrant connector extending into and engaged with said nozzle seat;
a locking arrangement disposed on said nozzle body, said locking arrangement including:
a slide housing extending from said nozzle body;
a slide movably mounted to said slide housing, said slide having a base and a paddle, said slide capable of movement in an axial direction between an extended position and a retracted position; and
a biasing element for biasing said slide in said extended position.

11. The hydrant assembly of claim 10 wherein said nozzle seat includes at least one lug mouth, said slide being manually movable between said extended position in which said base is engaged with said mouth to prevent rotation of said nozzle with respect to said hydrant and a retracted position in which said base is disengaged from said mouth to allow rotation of said muzzle with respect to said hydrant.

12. The hydrant assembly of claim 11 wherein said locking arrangement includes at least one bolt affixed to said housing, said bolt extending through said slide, whereby said bolt is configured to shepherd movement of said slide between said extended position and said retracted position.

13. The hydrant assembly of claim 11 wherein said locking arrangement includes at least two bolts affixed to said housing, said bolts extending through said slide, whereby said bolts shepherd movement of said slide between said extended position and said retracted position.

14. The hydrant assembly of claim 13 wherein said biasing element includes a spring disposed between said slide and said housing.

15. The hydrant assembly of claim 13 wherein said slide defines a first spring seat receiving one end of coil spring and said housing defines a second spring seat receiving an opposite end of said spring.

16. The hydrant assembly of claim 15 wherein said base is configured to engage said nozzle seat and move into said retracted position without operator intervention when said nozzle is inserted axially into said nozzle seat.

17. The hydrant assembly of claim 16 wherein said nozzle includes a handle extending radially from said nozzle body.

18. The hydrant assembly of claim 17 wherein said housing include a radial wall and a pair of axial walls extending from opposite ends of said radial wall, said slide movably fitted between said axial walls.

19. The hydrant assembly of claim 10 wherein said nozzle includes a compression seal fitted to an inner axial end of said nozzle body.

20. The hydrant assembly of claim 19 where said compression seal and said inner axial end include a dovetail interface, whereby said seal may be snap-fitted onto said inner axial end.

21. The hydrant assembly of claim 19 wherein said nozzle body, said handle and said slide housing are integrally formed as a single unitary structure.

22. A removable nozzle for a hydrant comprising:
a nozzle body having inner and outer axial ends;
a slide housing disposed on said nozzle body;
a slide movably mounted to said slide housing, said slide capable of movement in an axial direction between an extended position and a retracted position;
a spring disposed between said slide and said slide housing, said spring biasing said slide in said extended position;
a handle extending from said nozzle body;
a compression seal fitted to an inner axial end of said nozzle body; and
a pair of shoulder bolts, said slide movably mounted to said slide housing by said shoulder bolts.

23. The nozzle of claim 22 wherein said slide includes an axially extending base and a radially extending paddle.

24. The nozzle of claim 23 where said compression seal and said inner axial end include a dovetail interface, whereby said seal may be snap-fitted onto said inner axial end.

* * * * *